United States Patent
Chen et al.

(10) Patent No.: US 9,510,568 B2
(45) Date of Patent: Dec. 6, 2016

(54) SYSTEM AND METHOD FOR SHRIMP AQUACULTURE

(71) Applicants: Shiu Nan Chen, San Marino, CA (US); Sherwin Chen, San Marino, CA (US)

(72) Inventors: Shiu Nan Chen, San Marino, CA (US); Sherwin Chen, San Marino, CA (US)

( * ) Notice: Subject to any disclaimer, the term of this patent is extended or adjusted under 35 U.S.C. 154(b) by 133 days.

(21) Appl. No.: 14/595,165

(22) Filed: Jan. 12, 2015

(65) Prior Publication Data
US 2015/0196013 A1    Jul. 16, 2015

Related U.S. Application Data

(60) Provisional application No. 61/926,368, filed on Jan. 12, 2014.

(51) Int. Cl.
*A01K 61/00*    (2006.01)

(52) U.S. Cl.
CPC .................... *A01K 61/005* (2013.01)

(58) Field of Classification Search
CPC ....................................................... A01K 61/005
USPC .......................................................... 119/212
See application file for complete search history.

(56) References Cited

U.S. PATENT DOCUMENTS

| | | | |
|---|---|---|---|
| 2006/0185609 A1* | 8/2006 | Sato ....................... | A01K 61/00 119/230 |
| 2012/0204801 A1* | 8/2012 | Lawrence ............ | A01K 61/005 119/207 |
| 2015/0342156 A1* | 12/2015 | Sheriff ................. | A01K 63/042 119/211 |
| 2016/0183500 A1* | 6/2016 | Delabbio ............. | A01K 61/005 119/204 |

* cited by examiner

*Primary Examiner* — Kristen C Hayes
(74) *Attorney, Agent, or Firm* — Raymond Y. Chan; David and Raymond Patent Firm

(57) ABSTRACT

A shrimp aquaculture system includes the steps of: (1) preparing a water container; (2) exposing the water container under the sunlight, and then filling with predetermined amount of water; (3) adding 50 liter of liquid-fermentation feed into the water container at least 1 to 2 times per day; (4) adding 50 kilogram of beneficial agents into the water container once per day to obtain nursing water; (5) adding larva and young shrimp into the nursing water, and further adding a solid-fermentation feed into the nursing water, at least once a day, lasting for 0.5 to 3 months beginning on the date of adding young and larva shrimp; (6) three months later, adding regular shrimp feed containing beneficial agents into the water container; and (7) adding the amount of 1 to 3 ppm of photosynthetic bacteria into the nursing water of the water container once a day.

17 Claims, 3 Drawing Sheets

SYSTEM AND METHOD FOR SHRIMP AQUACULTURE

CROSS REFERENCE OF RELATED APPLICATION

This is a non-provisional application that claims the benefit of priority under 35 U.S.C. §119 to a provisional application, application No. 61/926,368, filed Jan. 12, 2014.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to an aquaculture system, and more particularly to an aquaculture system for shrimps, wherein the aquaculture system provides two methods for manufacturing a solid-fermentation feed and a liquid-fermentation feed respectively, which provides anaerobic fermentation and aerobic fermentation for manufacturing shrimp feed.

Description of Related Arts

Soybean powder and fat-free soybean powder are commonly used in shrimp feed of the conventional shrimp farming method. In other words, soybean powder and fat-free soybean powder are typical used for replacing an equal amount of animal protein of the shrimp feed, for example fish meal or shrimp meal, which are high in price and with low water stability.

However, the conventional shrimp feed with soybean powder and fat-free soybean powder has some disadvantages. Firstly, the pure soybean powder and fat-free powder cannot supply enough semi-micronutrients, vitamins, and mineral substance for shrimp farming, such that the survival rate of the shrimp will decrease and the mortality rate thereof will increase. Secondly, the conventional shrimp feed has low water stability, such that it is difficult to control PH value, dissolved oxygen, and the amount of ammonia nitrogen within nursing water so as to increase monitor cost of the conventional shrimp farming method. Thirdly, such shrimp feed are vegetable protein feed and is failing in acting the role of animal protein source, so the efficiency for such shrimp feed is lower than the shrimp feed with animal protein source, and therefore feed conversion rate of the conventional shrimp farming method will dramatically increase.

In order to over the above mentioned drawbacks, it is highly desired to provide a method for manufacturing shrimp feed which can supply essential nutrients for shrimp so as to increase survival rate and feed conversion rate thereof and further provide a shrimp aquaculture system having low mortality rate, low monitor rate and high water stability.

SUMMARY OF THE PRESENT INVENTION

A main object of the present invention is to provide a shrimp aquaculture system utilized two kinds of fermentation feeds, which has low mortality rate, high survival rate, high production rate, and low feed conversion rate.

Another object of the present invention is to provide a method for producing liquid-fermentation feed, wherein such method comprises a liquid-fermentation container which is an airtight container such that the soybean and fat-free soybean powder can be fermented under an anaerobic environment for obtaining the liquid-fermentation feed.

Another object of the present invention is to provide a method for producing solid-fermentation feed, wherein such method comprises a solid-fermentation container which is good in permeability such that the soybean and fat-free soybean powder can be fermented under an aerobic environment for obtaining the solid-fermentation feed.

Another object of the present invention is to provide a method for producing solid-fermentation feed comprising aerobic bacteria, anaerobic bacteria, and facultative microorganism for being solid fermented species so as to obtain the solid-fermentation feed which can supply plentiful and variety of required nutrient for shrimps.

Another object of the present invention is to provide a method for producing liquid-fermentation feed, wherein the liquid-fermentation feed are soluble in water, environmental friendly, and easy to decompose so as to reduce water pollutions while discharging the nursing water to the environment.

Another object of the present invention is to provide methods for producing solid-fermentation feed and liquid-fermentation feed, wherein these two method are easy to implement, such that raw materials, such as soybean and fat-free soybean powder, that is used to prepare such two kinds of feed are easy to obtain so as to reduce the manufacturing cost thereof.

Another object of the present invention is to provide a shrimp aquaculture system adapted to not only provide high quality of nursing water of a water container but also provides high immunity shrimp so as to decrease mortality rate and increase survival rate of shrimps.

Additional advantages and features of the invention will become apparent from the description which follows, and may be realized by means of the instrumentalities and combinations particular point out in the appended claims.

According to the present invention, the foregoing and other objects and advantages are attained by providing a shrimp aquaculture system, which comprises the following steps of:

(1) preparing a water container;

(2) exposing the water container under the sunlight, and then filling with predetermined amount of water; after step (2), (3) adding a liquid-fermentation feed with an amount of 50 liter into the water container at least 1 to 2 times per day; after step (3), (4) adding 50 kilogram of beneficial agents into the water container once per day to obtain nursing water;

(5) adding larva and young shrimp into the nursing water of the water container, and adding a solid-fermentation feed into the nursing water of water container, at least once a day, lasting for 0.5 to 3 months beginning on the date of adding young and larva shrimp;

(6) three months later, adding regular shrimp feed containing beneficial agents into the water container; and (7) adding the amount of 1 to 3 ppm of photosynthetic bacteria into the nursing water of the water container once a day.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
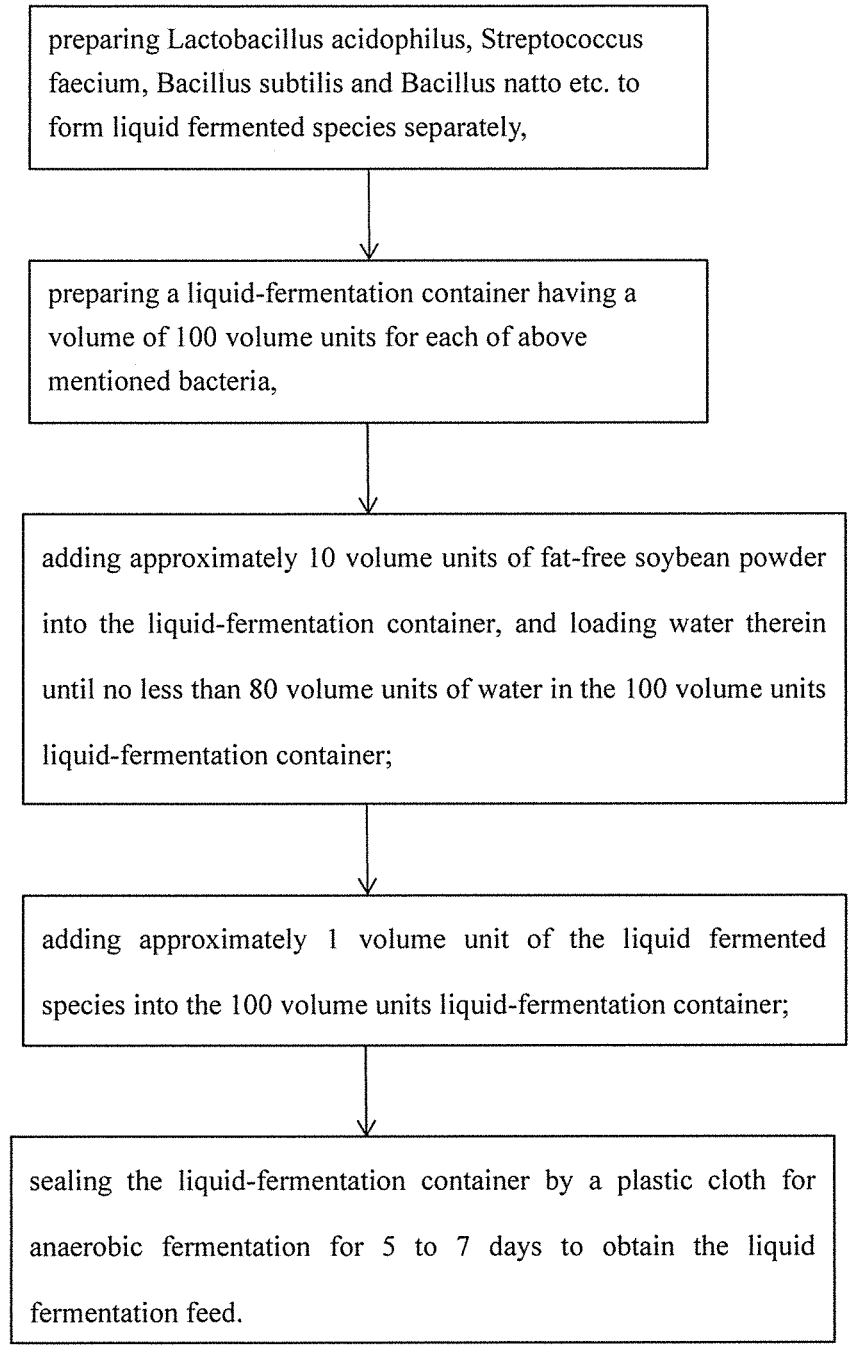
FIG. 1 is a flowchart of a method for manufacturing liquid-fermentation feed according to a preferred embodiment of the present invention.
Figure 2:
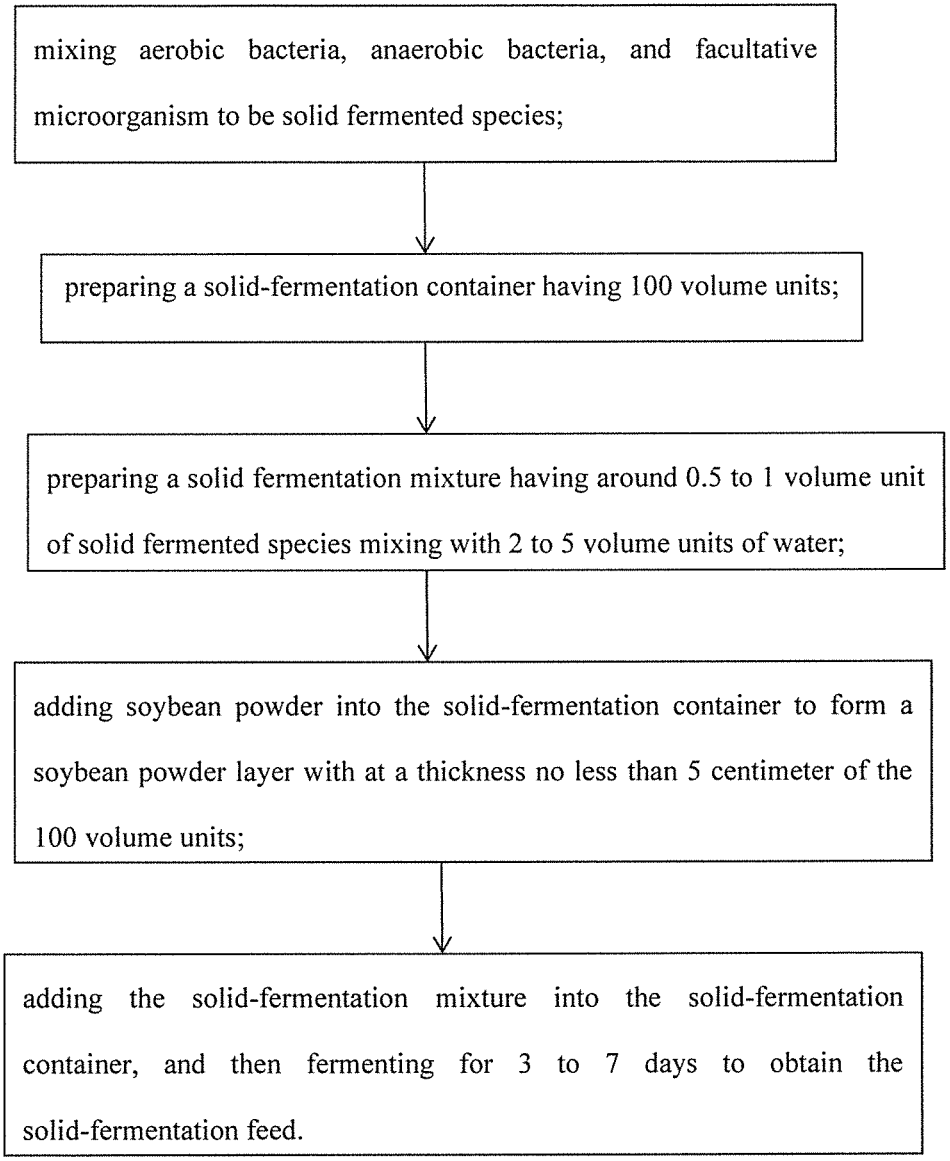
FIG. 2 is a flowchart of a method for manufacturing solid-fermentation feed according to a preferred embodiment of the present invention.

Referring to FIG. 1 to FIG. 2 of the drawings, a marine shrimp aquaculture system according to a preferred embodiment of the present invention is illustrated, wherein the shrimp aquaculture system is a containment system, such as a pond or water container. The system optionally comprises water container and at least two types of fermented feeds.

Accordingly, the fermented feeds comprises liquid-fermentation feed and solid-fermentation feed, wherein the liquid-fermentation feed is applied for nursing water preparation, and the solid-fermentation feed is applied for nursing larva, young, anfjuvenile shrimp. The liquid-fermentation feed is placed into the water within the water container so as to prepare nursing water for shrimps, and prevent fatal bacterial breeding within the nursing water; and the solid-fermentation feed is a floating feed, the solid-fermentation feed provides essential nutrient to larva, young, and juvenile shrimps. In other words, the liquid and solid fermentation feeds are capable to maintain optionally nursing water and enhance a survival rate for shrimps during the shrimp aquaculture system.

A method for preparing the liquid-fermentation feed for a shrimp aquaculture system according to the preferred embodiment of the present invention comprises the steps of:

(1) preparing *Lactobacillus acidophilus, Streptococcus faecium, Bacillus subtilis* and *Bacillus natto* etc. to form liquid fermented species separately;

(2) preparing a liquid-fermentation container having a volume of 100 volume units for each of above mentioned bacteria, (3) adding approximately 10 volume units of fat-free soybean powder into each of the liquid-fermentation container, and loading water therein until no less than 80 volume units of the 100 volume units liquid-fermentation container;

(4) adding approximately 1 volume unit of the liquid fermented species that prepared in step (1) into the 100 volume units liquid-fermentation container, and then completely mixing the liquid fermented species, water, and the fat-free soybean powder therein; and (5) sealing all the liquid-fermentation containers by a plastic cloth for anaerobic fermentation for 5 to 7 days to obtain the liquid fermentation feed.

Referring to step (1), *lactobacillus acidophilus* and *streptococcus faecium* are species in the genus *lactobacillus*. The *Bacillus subtilis* is a member of the genus *Bacillus*, and the *Bacillus nattois* a traditional Japanese food made from soybeans fermented with *Bacillus subtilis*. Therefore, *lactobacillus acidophilus, streptococcus faecium, Bacillus subtilis* and related *Bacillus* products can generate fermentation for the fat-free soybean powder to produce liquid fermented feed.

Referring to step (2), according to the step (1), at least four liquid-fermentation containers are provided, wherein the liquid-fermentation containers are preferably glass fiber or plastic containers. In other words, the airtight containers can ensure the liquid fermented species and the fat-free soybean powder fordoing anaerobic fermentation under an anaerobic environment.

It is worth mentioning that the liquid fermented species and the fat-free soybean powder are soluble in water, environmental friendly, and easy to decompose, such that the liquid fermented feed doesn't generate water pollutions while discharging the nursing water to the environment.

A method for preparing a solid-fermentation feed for the shrimp aquaculture system according to the preferred embodiment of the present invention comprises the steps of:

(1) mixing aerobic bacteria, anaerobic bacteria, and facultative microorganism to be solid fermented species;

(2) preparing a solid-fermentation container having 100 volume units;

(3) preparing a solid fermentation mixture having around 0.5 to 1 volume unit of solid fermented species mixing with 2 to 5 volume units of water;

(4) adding soybean powder into the solid-fermentation container to form a soybean powder layer with at a thickness no less than 5 centimeter in the 100 volume units solid-fermentation container; after step (4), (5) adding the solid-fermentation mixture into the solid-fermentation container, and then doing fermentation for 3 to 7 days to obtain the solid-fermentation feed;

The method for preparing the solid fermented feed for the shrimp aquaculture system further comprises a step (4.1) which is achieved between the step (4) and the step (5), wherein the step (4.1) is adding a beneficial agent into the solid fermentation mixture and completely mixing. Preferably, the beneficial agent is bioglucanaquagreen.

Referring to step (1), the aerobic bacteria includes *bacillus subtilis* and *bacillus natto,* and the anaerobic bacteria includes *lactobacillus acidophilus* and *streptococcus faecium,* and the facultative microorganism is *sacchromyces sarvercia.*

Referring to step (2), the solid-fermentation container is an air-permeable container. Preferably, the solid-fermentation container is made of bamboo, such that bottom surface of the solid-fermentation container has good ventilation so as to improve growing rate of the aerobic bacteria.

Referring to step (4), the soybean powder can be regular soybean or fat-free soybean powder. In other words, two types of solid-fermentation feed can be produced. One is the solid-fermentation feed with regular soybean powder, and the other type is the solid-fermentation feed with fat-free soybean powder. Therefore, both of the two types of solid-fermentation feed can provide essential nutrients for different ages of shrimp.

Referring to step (5), the temperature of the fermentation reaches to forty to fifty centigrade during the first 3 to 5 days, and relative yeast will generate on the surface of the solid-fermentation feed within the final two days.

It is worth mentioning that the solid-fermentation feed comprises multiple types of beneficial bacteria and microorganism, and sort of anaerobic bacteria, which is capable of supporting the fat-free soybean powder thereof to generate aerobic fermentation, such that the solid-fermentation feed is able to provide essential nutrient and increase immunity of the juvenile shrimp, so as to increase the survival rate thereof According to the preferred embodiment of the present invention, the liquid—fermentation feed is utilized to maintain the number of fatal bacteria generated within the nursing water, such that the larva shrimp or shrimp seed can be safely bred within the nursing water. The solid-fermentation feed provides required nutrients for juvenile and larva shrimp, such that the juvenile and larva shrimps grow up healthily after feeding with the solid-fermentation feed. Due to that the larva and juvenile shrimps have lower immunity than the adult shrimps, the liquid and solid fermentation feed are able to not only create a better breeding environment for the shrimp but also increase immunities of shrimp therefor.

Figure 3:
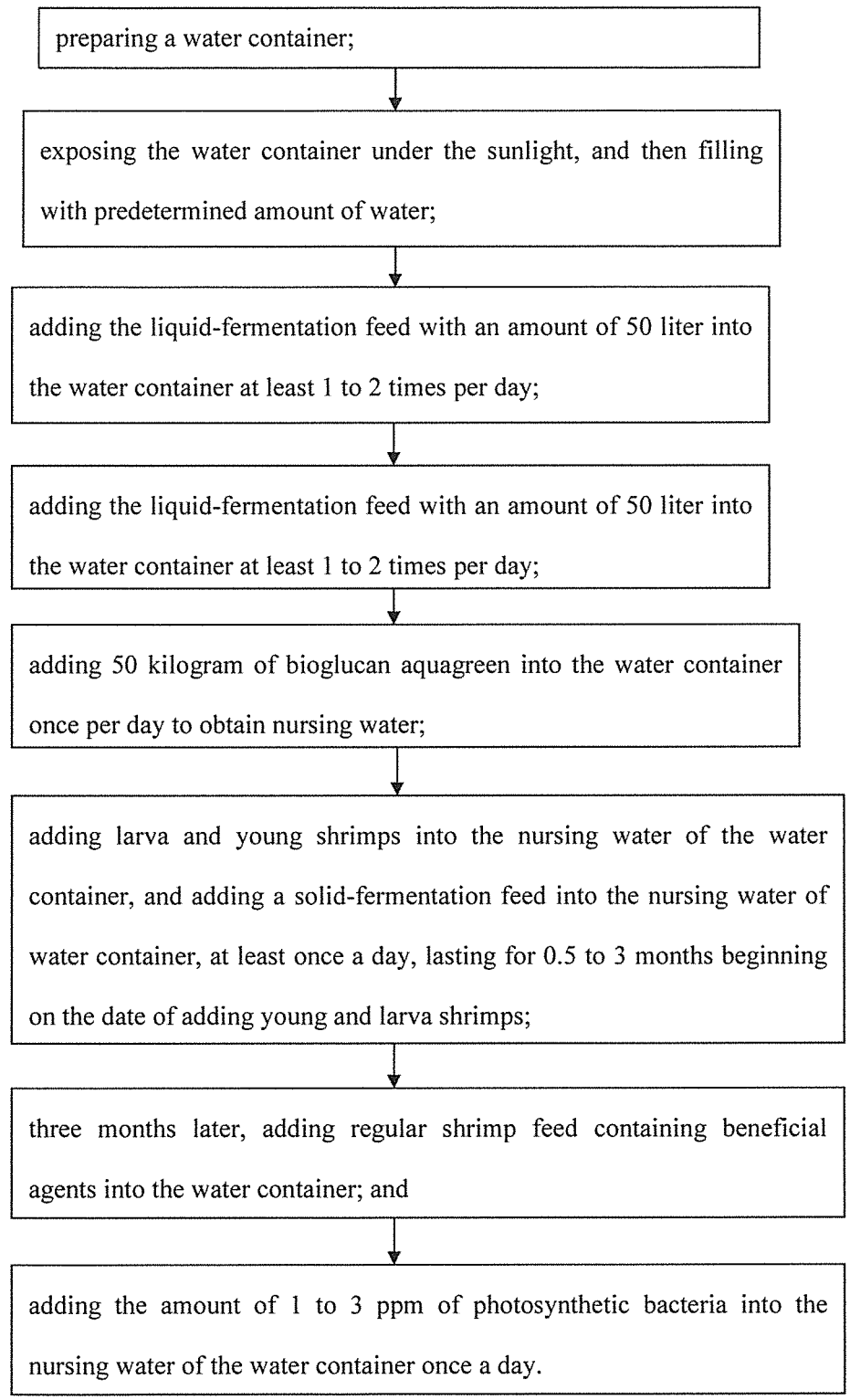
FIG. 3 is a flowchart of an aquaculture system for shrimps according to a preferred embodiment of the present invention.

As shown in FIG. 3, a shrimp aquaculture system according to a preferred embodiment of the present invention is illustrated, wherein the shrimp aquaculture system comprises the following steps of:

(1) preparing a water container;
(2) exposing the water container under the sunlight, and then filling with predetermined amount of water; after step (2),
(3) adding the liquid-fermentation feed with an amount of 50 liter into the water container at least 1 to 2 times per day; after step (3),
(4) adding 50 kilogram of bioglucanaquagreen into the water container once per day to obtain nursing water;
(5) adding larva and young shrimps into the nursing water of the water container, and adding the solid-fermentation feed into the nursing water of water container, at least once a day, lasting for 0.5 to 3 months beginning on the date of adding young and larva shrimps; and
(6) three months later, adding regular shrimp feed containing beneficial agents into the water container; and
(7) adding the amount of 1 to 3 ppm of photosynthetic bacteria into the nursing water of the water container once a day.

Referring to step (1), the water container is preferably a culture pond containing predetermined amount of water.

Referring to step (6), the beneficial agents preferably includes bioglucanaquagreen or digestive enzymes or combination thereof.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:
1. A shrimp aquaculture method, comprising the steps of:
(a) preparing a water container;
(b) exposing the water container under the sunlight, and then filling with a predetermined amount of water;
(c) adding a fermentation feed with an amount of 50 liter into said water container at least 1 to 2 times per day;
(d) adding a predetermined amount of beneficial agents into said water container once per day to obtain nursing water;
(e) adding larva and young shrimps into said nursing water in said water container, and adding a solid-fermentation feed into said nursing water in said water container, at least once a day, lasting for 0.5 to 3 months beginning on the date of adding young and larva shrimps; and
(f) three months later, adding regular shrimp feed containing said beneficial agents into said water container.

2. The shrimp aquaculture method, as recited in claim 1, after step (f), further comprising a step (g) adding the amount of 1 to 3 ppm of photosynthetic bacteria into said nursing water in said water container once a day.

3. The shrimp aquaculture method, as recited in claim 1, wherein said water container is a culture pond.

4. The shrimp aquaculture method, as recited in claim 1, wherein said beneficial agents comprises bioglucanaquagreen and digestive enzymes.

5. The shrimp aquaculture method, as recited in claim 1, wherein said fermentation feed is liquid-fermentation feed which is prepared by the steps of:
(1) preparing *Lactobacillus acidophilus, Streptococcus faecium, Bacillus subtilis* and *Bacillus natto* to form liquid fermented species separately;
(2) preparing a liquid-fermentation container having a volume of 100 volume units for each bacteria;
(3) adding approximately 10 volume units of fat-free soybean powder into said liquid-fermentation container, and loading water therein until no less than 80 volume units of said liquid-fermentation container;
(4) adding approximately 1 volume unit of said liquid fermented species into said liquid-fermentation container, and then completely mixing the liquid fermented species, water, and the fat-free soybean powder therein; and
(5) sealing said liquid-fermentation container by a plastic cloth for anaerobic fermentation for 5 to 7 days to obtain said liquid fermentation feed.

6. The shrimp aquaculture method, as recited in claim 5, wherein said liquid-fermentation container is an airtight container.

7. The shrimp aquaculture method, as recited in claim 6, wherein said liquid-fermentation container is a glass fiber container.

8. The shrimp aquaculture method, as recited in claim 6, wherein said liquid-fermentation container is a plastic container.

9. The shrimp aquaculture method, as recited in claim 1, wherein said fermentation feed is solid-fermentation feed which is prepared by the steps of:
(1) mixing aerobic bacteria, anaerobic bacteria, and facultative microorganism to be solid fermented species;
(2) preparing a solid-fermentation container having 100 volume units;
(3) preparing a solid fermentation mixture having around 0.5 to 1 volume unit of said solid fermented species mixing with 2 to 5 volume units of water;
(4) adding soybean powder into said solid-fermentation container to form a soybean powder layer with at a thickness no less than 5 centimeter; and
(5) adding said solid-fermentation mixture into said solid-fermentation container, and then fermenting for 3 to 7 days to obtain said solid-fermentation feed.

10. The shrimp aquaculture method, as recited in claim 9, after step (4), further comprising a step (4.1) which is adding a beneficial agent into said solid fermentation mixture and completely mixing.

11. The shrimp aquaculture method, as recited in claim 9, wherein said beneficial agent is bioglucanaquagreen.

12. The shrimp aquaculture method, as recited in claim 9, wherein said aerobic bacteria includes *bacillus subtilis* and *bacillus natto*, and said anaerobic bacteria includes *lactobacillus acidophilus* and *streptococcus faecium*, and said facultative microorganism is *sacchromyces sarvercia*.

13. The shrimp aquaculture method, as recited in claim 9, wherein said solid-fermentation container is an air-permeable container.

14. The shrimp aquaculture method, as recited in claim 13, wherein said solid-fermentation container is a bamboo container.

15. The shrimp aquaculture method, as recited in claim 13, wherein said solid-fermentation container is a wood container.

16. The shrimp aquaculture method, as recited in claim 9, wherein said soybean powder can be regular soybean or fat-free soybean powder.

17. The shrimp aquaculture method, as recited in claim 9, wherein the temperature of the fermentation reaches to forty to fifty centigrade during the first 3 to 5 days, and relative yeast generates on a surface of said solid-fermentation feed within the final two days.

* * * * *